United States Patent [19]
Thompson

[11] Patent Number: 5,931,118
[45] Date of Patent: Aug. 3, 1999

[54] SELF-FILLING BIRDBATH SYSTEM

[76] Inventor: Eugene R. Thompson, 2703 - 50th Ave., Lone Rock, Iowa 50559

[21] Appl. No.: 09/184,785

[22] Filed: Nov. 2, 1998

[51] Int. Cl.[6] .................................................. A01K 39/026
[52] U.S. Cl. .............................................. 119/69.5; 52/16
[58] Field of Search ....................... 119/69.5, 72; 239/17, 239/12; D30/123; 52/16; 47/39, 66.6

[56] References Cited

U.S. PATENT DOCUMENTS

| | | | |
|---|---|---|---|
| 1,354,113 | 9/1920 | Leverett | 119/69.5 |
| 1,962,840 | 6/1934 | Rives | 239/17 |
| 2,878,781 | 7/1959 | Wingfield | 119/72 |
| 4,630,569 | 12/1986 | Dielman | 119/1 |
| 5,709,051 | 1/1998 | Mazziotti | 52/12 |
| 5,743,212 | 4/1998 | Forjohn | 119/69.5 |
| 5,862,632 | 1/1999 | Zima | 52/16 |

*Primary Examiner*—Michael J. Carone
*Assistant Examiner*—Francis T. Palo

[57] ABSTRACT

A self-filling birdbath system for utilizing rainwater collected within a conventional rain gutter system to fill and clean a birdbath. The inventive device includes a birdbath, a collection tube connectable to a drain spout of a rain gutter, an elbow tube coupled with the collection tube, a transporting tube coupled to the elbow tube opposite of the collection tube, and a fill tube coupled to the transporting tube and extending through the birdbath above the rim of the basin. Rainwater is accumulated within the rain gutter and is drained through the drain spout. The rainwater is then forced through the transporting tube through the fill tube and out a dispensing end where the water dispensed into the basin. The rainwater is agitated within the basin of the birdbath thereby cleaning the basin when the water level within the basin exceeds the rim of the basin.

17 Claims, 3 Drawing Sheets

5,931,118

SELF-FILLING BIRDBATH SYSTEM

BACKGROUND OF THE INVENTION

1. Field of the Invention

The present invention relates generally to birdbaths and more specifically it relates to a self-filling birdbath system for utilizing rainwater collected within a conventional rain gutter system to fill and clean a birdbath.

2. Description of the Prior Art

Birdbaths have been in use for years. Typically, a birdbath has a base, neck and a basin for storing water for birds to bath and drink from. The user typically has to either carry a bucket of water to fill the conventional birdbath every other day, or the user has to drag a garden hose to the birdbath for filling the birdbath. This must be repeated whenever the water within the basin of the birdbath becomes extremely low.

This can be extremely burdensome for the user, especially if they are incapable of significant physical activity. In addition, if the user is gone for an extended period of time, the basin will quickly become emptied and will not be filled again until the user comes home again. Another problem with conventional birdbaths is that they are susceptible to debris build-up such as dirt and leaves thereby creating an undesirable appearance for the user.

While these devices may be suitable for the particular purpose to which they address, they are not as suitable for utilizing rainwater collected within a conventional rain gutter system to fill and clean a birdbath. Conventional birdbaths accumulate debris that can create an unsightly appearance. In addition, conventional birdbaths require the user to physically fill them whenever they are empty.

In these respects, the self-filling birdbath system according to the present invention substantially departs from the conventional concepts and designs of the prior art, and in so doing provides an apparatus primarily developed for the purpose of utilizing rainwater collected within a conventional rain gutter system to fill and clean a birdbath.

SUMMARY OF THE INVENTION

In view of the foregoing disadvantages inherent in the known types of birdbaths now present in the prior art, the present invention provides a new self-filling birdbath system construction wherein the same can be utilized for utilizing rainwater collected within a conventional rain gutter system to fill and clean a birdbath.

The general purpose of the present invention, which will be described subsequently in greater detail, is to provide a new self-filling birdbath system that has many of the advantages of the birdbaths mentioned heretofore and many novel features that result in a new self-filling birdbath system which is not anticipated, rendered obvious, suggested, or even implied by any of the prior art birdbaths, either alone or in any combination thereof.

To attain this, the present invention generally comprises a birdbath, a collection tube connectable to a drain spout of a rain gutter, an elbow tube coupled with the collection tube, a transporting tube coupled to the elbow tube opposite of the collection tube, and a fill tube coupled to the transporting tube and extending through the birdbath above the rim of the basin. Rainwater is accumulated within the rain gutter and is drained through the drain spout. The rainwater is then forced through the transporting tube through the fill tube and out a dispensing end where the water dispensed into the basin. The rainwater is agitated within the basin of the birdbath thereby cleaning the basin when the water level within the basin exceeds the rim of the basin.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practices and carried out in various ways. Also, it is to be understood that the phraseology and terminology employed herein are for the purpose of the description and should not be regarded as limiting.

A primary object of the present invention is to provide a self-filling birdbath system that will overcome the shortcomings of the prior art devices.

Another object is to provide a self-filling birdbath system that is self-filling.

An additional object is to provide a self-filling birdbath system that is self-cleaning.

A further object is to provide a self-filling birdbath system that reduces the need for the user to manually fill the basin of the birdbath.

Another object is to provide a self-filling birdbath system that is environmentally friendly by conserving conventional water usage.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
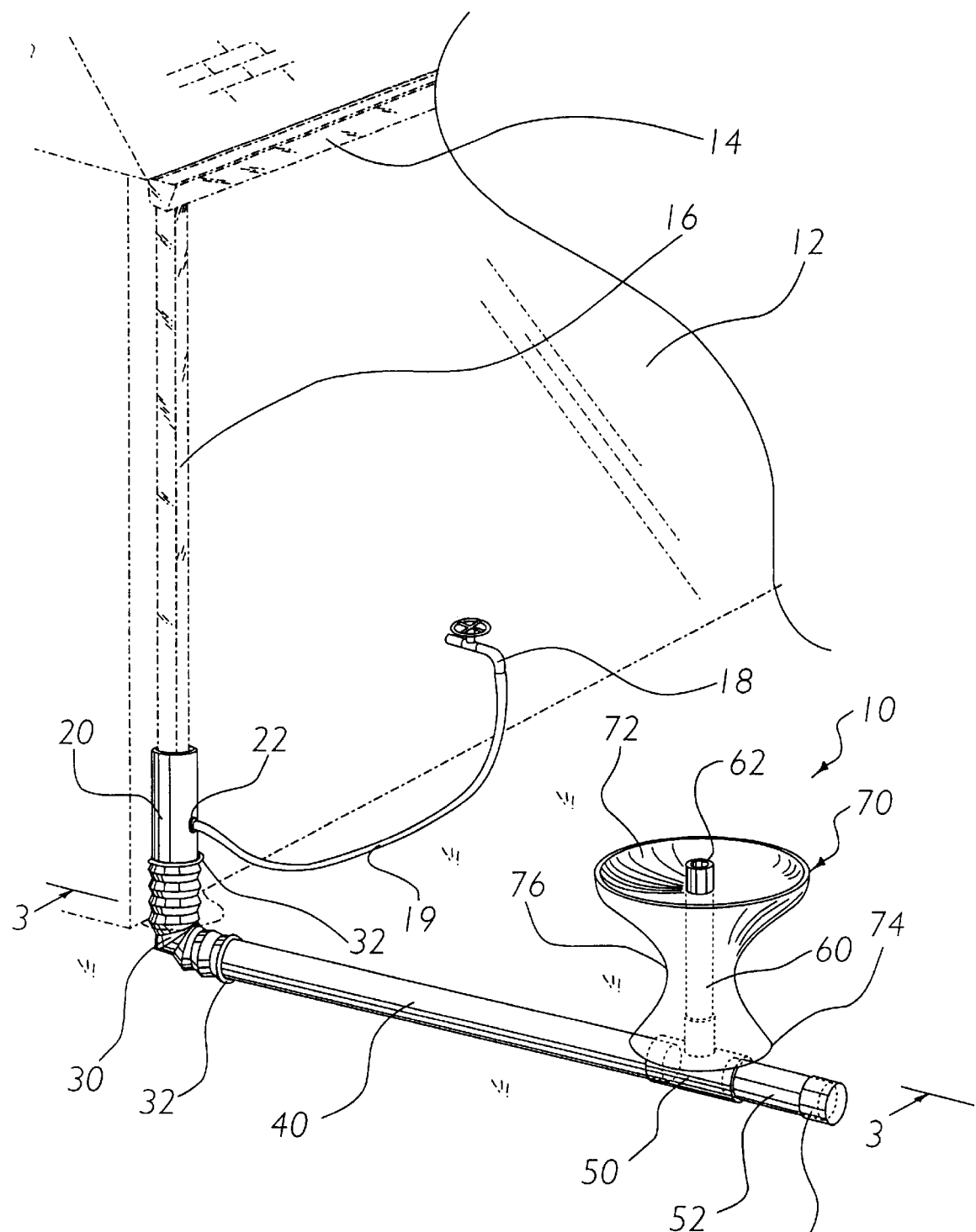
FIG. 1 is an upper perspective view of the present invention connected to a conventional rain gutter system.
Figure 2:
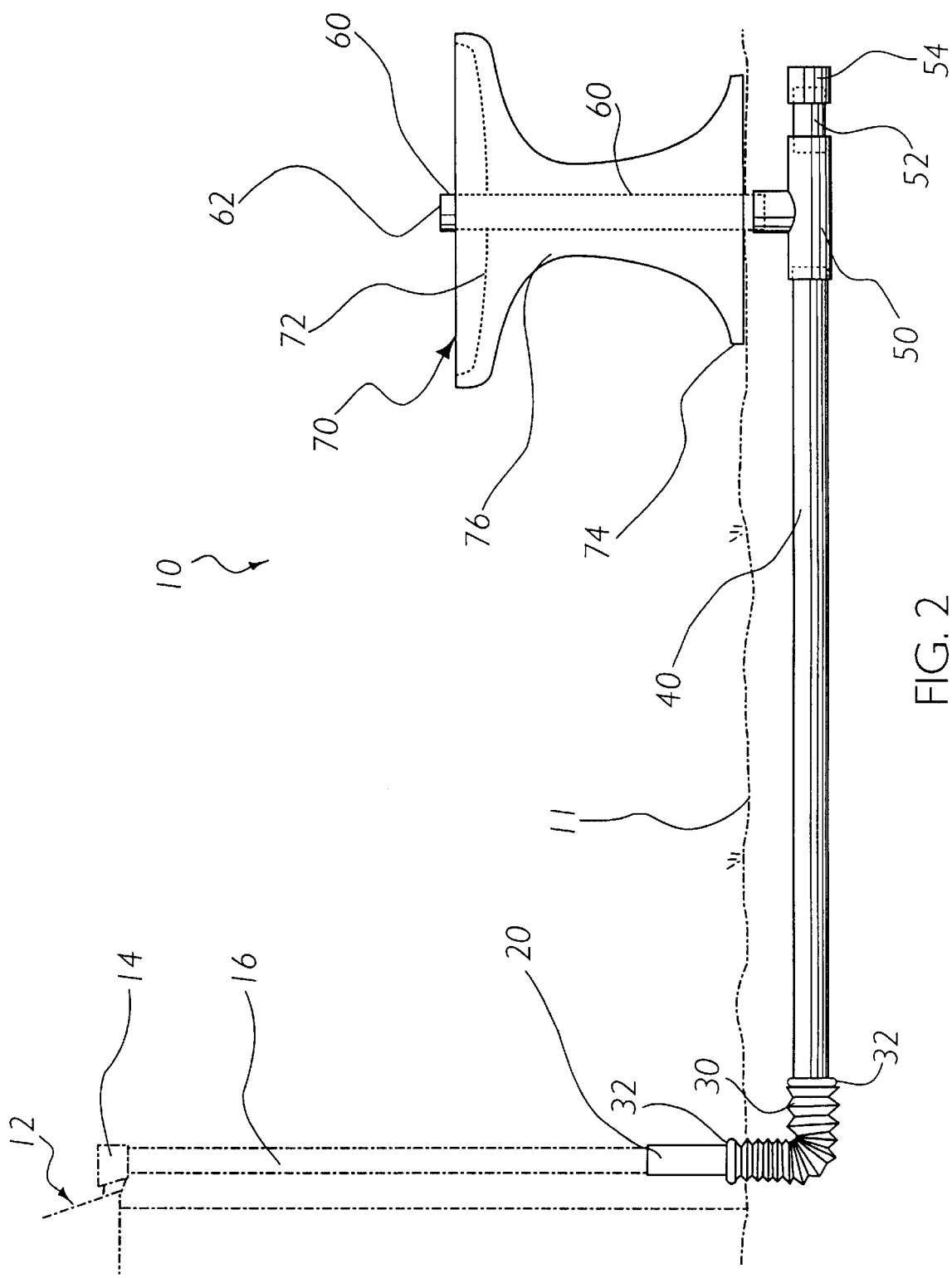
FIG. 2 is a side view of the present invention connected to a conventional rain gutter system.
Figure 3:
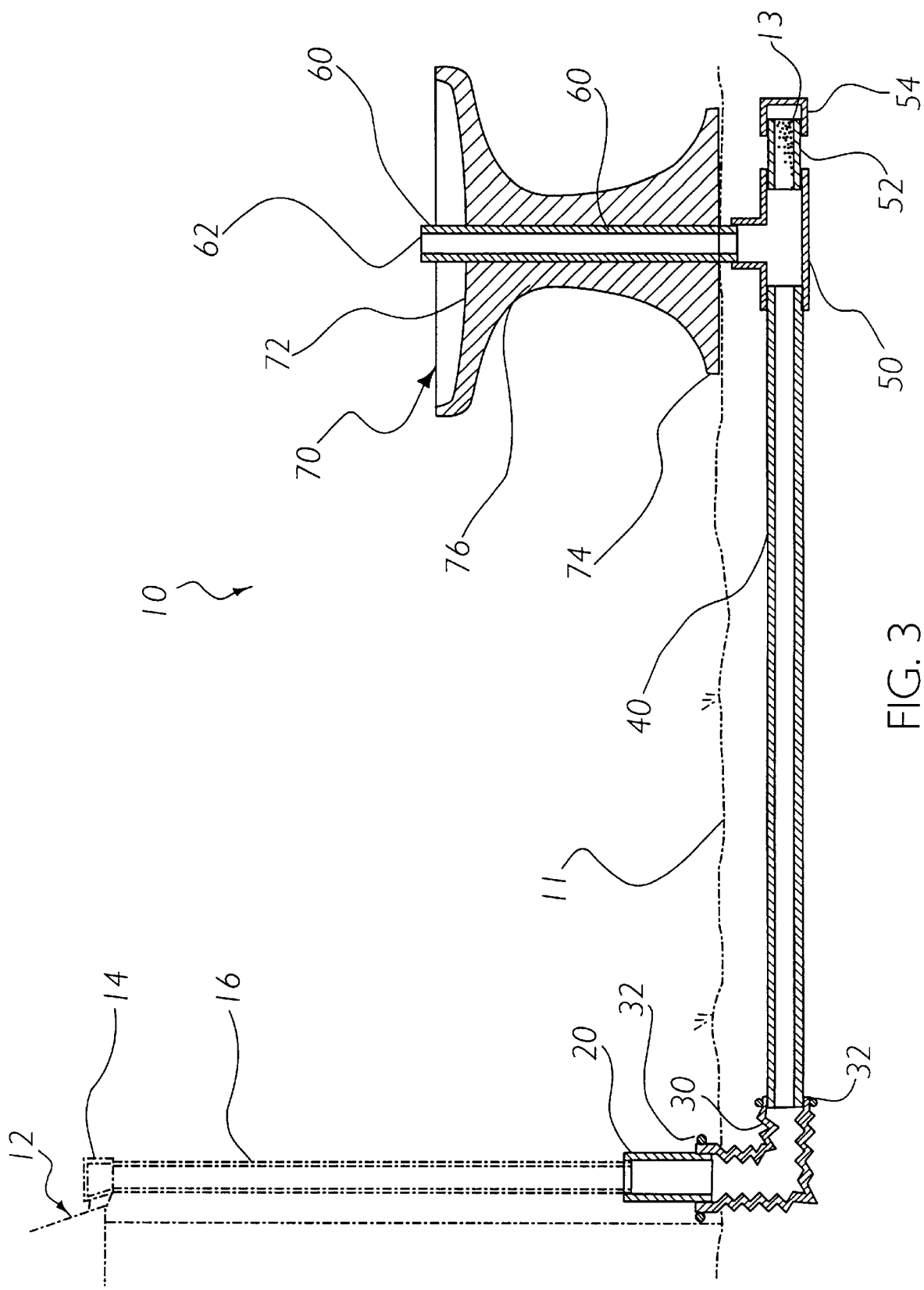
FIG. 3 is a cross-sectional view taken along line 3—3 of FIG. 1.

Turning now descriptively to the drawings, in which similar reference characters denote similar elements throughout the several view, FIGS. 1 through 3 illustrate a self-filling birdbath system 10, which comprises a birdbath 70, a collection tube 20 connectable to a drain spout 16 of a rain gutter 14, an elbow tube 30 coupled with the collection tube 20, a transporting tube 40 coupled to the elbow tube 30 opposite of the collection tube 20, and a fill tube 60 coupled to the transporting tube 40 and extending through the birdbath 70 above the rim of the basin 72. Rainwater is accumulated within the rain gutter 14 and is drained through the drain spout 16. The rainwater is then forced through the transporting tube 40 through the fill tube 60 and out a dispensing end 62 where the water dispensed into the basin 72. The rainwater is agitated within the basin 72 of the birdbath 70 thereby cleaning the basin 72 when the water level within the basin 72 exceeds the rim of the basin 72.

As shown in FIGS. 1 through 3 of the drawings, the birdbath 70 includes a base 74, a neck 76 extending upwardly from the base 74, and a basin 72 supported by the neck 76 opposite of the base 74. The birdbath 70 is constructed of conventional materials such as plastic, concrete or metal. The birdbath 70 may be constructed of various shapes and sizes as can be appreciated by one skilled in the art. The basin 72 has an unnumbered rim that provides the maximum water level retainable within the basin 72.

As shown in FIGS. 1 and 2, a conventional rain gutter 14 is attached to an edge of a roof of a building structure 12 for collecting rainwater deflected by the roof. A drain spout 16 is connected to the rain gutter 14 and extends toward the ground surface 11 for dispensing the collected rainwater within the rain gutter 14. The drain spouts 16 come in various cross-sectional shapes, however the most common design has a rectangular cross-section as shown in FIG. 1 of the drawings.

As shown in FIG. 1 through 3, a collection tube 20 is sealably coupled to the end of the drain spout 16 opposite of the rain gutter 14. The rain gutter 14 may have to be shortened to accommodate the length of the collection tube 20. The collection tube 20 is sealaby coupled to the drain spout 16 by conventional seal means such as silicone or foam that is placed between the collection tube 20 and the drain spout 16. The collection tube 20 can alternatively include a partially enclosed end that is shaped to snugly receive the drain spout 16.

As best shown in FIG. 2 of the drawings, an elbow tube 30 is coupled to the collection tube 20 opposite of the drain spout 16 by a conventional clamp 32. The elbow tube 30 is preferably constructed of a flexible material, however a solid structure 12 may also be utilized.

As shown in FIGS. 1 through 3, a transporting tube 40 is coupled to the elbow tube 30 by another conventional clamp 32 opposite of the collection tube 20. The transporting tube 40 is preferably angled downwardly from the elbow tube 30 for preventing accumulation of debris 13 within the transporting tube 40. The transporting tube 40 and the collection tube 20 are preferably constructed from a relatively broad diameter PVC pipe, however various other types of well-known material and sizes may be utilized.

As best shown in FIGS. 2 and 3 of the drawings, a T-member 50 is coupled to the transporting tube 40 opposite of the elbow tube 30. A collecting tube 52 is coupled to an end of the T-member 50 opposite of the transporting tube 40. A cap 54 is attached to the collecting tube 52 opposite of the T-member 50 as best shown in FIG. 2. The collecting tube 52 is for collecting debris 13 during extended use of the present invention.

As shown in FIGS. 2 and 3, a fill tube 60 is coupled to the T-member 50 substantially orthogonal to the transporting tube 40. The fill tube 60 extends upwardly through the ground surface 11 into an unnumbered bore within the birdbath 70. The fill tube 60 extends upwardly through the basin 72 of the birdbath 70 as shown in FIGS. 2 and 3. The dispensing end 62 of the fill tube 60 is preferably higher than the unnumbered rim of the basin 72 for creating agitation of the water within the basin 72 during filling. However, it can be appreciated by one skilled in the art that the dispensing end 62 of the fill tube 60 may be lower than the unnumbered rim of the basin 72.

As shown in FIG. 1, a female coupler 22 is preferably connected to a side of the collection tube 20 for removably receiving a male coupler of a conventional garden hose 19. The conventional garden hose 19 is connectable to a water spout 18 of the building structure 12 for allowing the user to controllably fill the basin 72 of the birdbath 70 during seasonally dry periods.

To install the invention, the user attaches the collection tube 20 to the drain spout 16 of the conventional rain gutter 14. The user then digs a trench from the collection tube 20 to a place where the birdbath 70 is to be positioned. The user then connects the elbow tube 30 to the collection tube 20 and extends the elbow tube 30 into the trench. The user then connects a transporting tube 40 to the elbow tube 30 and positions the transporting tube 40 within the trench. The transporting tube 40 preferably is slanted downwardly from the elbow tube 30 to force the rainwater away from the elbow tube 30.

A T-member 50 is coupled to the transporting tube 40 as shown in FIG. 2 of the drawings. A collecting tube 52 with a cap 54 is connected to the T-member 50 opposite of the transporting tube 40 for collecting debris 13. The fill tube 60 is connected to the T-member 50 as shown in FIGS. 2 and 3 of the drawings. The trench is then completely enclosed with the sod being placed on top. The birdbath 70 is then positioned about the fill tube 60 as shown in FIG. 3 of the drawings. The fill tube 60 is sealed with a conventional sealer within the basin 72 to prevent leakage about the fill tube 60.

When it rains, the rainwater accumulated within the rain gutter 14 flows into the drain spout 16 and then into the collection tube 20. The rainwater is then forced through the elbow member into the transporting tube 40 where the water pressure created by the water within the drain spout 16 forces the rainwater up through the fill tube 60. The water is emitted through the dispensing end 62 of the fill tube 60. The emitted water then drops into the basin 72 of the birdbath 70 thereby agitating the water and debris 13 within the basin 72. This process continues until the water level within the basin 72 is higher than the unnumbered rim of the basin 72, then the water and debris 13 overflows the basin 72 until the rain stops. The collecting tube 52 accumulates any debris 13 that remains within the transporting tube 40 and the fill tube 60 to prevent clogging of the invention during extended use. If a dry season is encountered or the user desires to clean out the basin 72, the user simply has to open the water spout 18 of the building structure 12 thereby flowing water through the invention into the basin 72 for filling and cleaning the basin 72.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A self-filling birdbath system, comprising:
   a pipe structure having at least one pipe, wherein said pipe structure has a first end and a second end;
   a coupling means for sealably connecting said first end of said pipe structure to a drain spout of a rain gutter;
   a birdbath having a water basin; and
   a fill tube having a dispensing end and lower end coupled to said second end of said pipe structure, wherein said fill tube extends through said birdbath to dispense collected water from said conventional rain gutter into said water basin.

2. The self-filling birdbath system of claim 1, including a debris collecting means connected to pipe structure for reducing clogging of said pipe structure.

3. The self-filling birdbath system of claim 2, wherein said dispensing end is higher than a floor of said basin.

4. The self-filling birdbath system of claim 3, wherein said dispensing end is higher in elevation than said basin for increasing water agitation during filling.

5. The self-filling birdbath system of claim 4, wherein said pipe structure comprises:
   a collection tube connectable to said drain spout by said coupling means;
   an elbow tube connected to said collection tube;
   a transporting tube connected to said elbow tube opposite of said collection tube; and
   a T-member connected to said transporting tube opposite of said elbow tube and connected to said debris collecting means.

6. The self-filling birdbath system of claim 5, wherein said debris collecting means comprises:
   a length of collecting tube connected to said T-member opposite of said transporting tube; and
   a cap coupled to said collecting tube opposite of said T-member.

7. The self-filling birdbath system of claim 6, wherein said coupling means is a foam structure.

8. The self-filling birdbath system of claim 6, wherein said coupling means is silicone.

9. A self-filling birdbath system, comprising:
   a pipe structure having at least one pipe, wherein said pipe structure has a first end and a second end;
   a coupling means for sealably connecting said first end of said pipe structure to a drain spout of a rain gutter;
   a birdbath having a water basin;
   a fill tube having a dispensing end and lower end coupled to said second end of said pipe structure, wherein said fill tube extends through said birdbath to dispense collected water from said conventional rain gutter into said water basin; and
   a water filling means connected to said pipe structure for selective filling of said water basin of said birdbath.

10. The self-filling birdbath system of claim 9, including a debris collecting means connected to pipe structure for reducing clogging of said pipe structure.

11. The self-filling birdbath system of claim 10, wherein said dispensing end is higher than a floor of said basin.

12. The self-filling birdbath system of claim 11, wherein said dispensing end is higher in elevation than said basin for increasing water agitation during filling.

13. The self-filling birdbath system of claim 12, wherein said pipe structure comprises:
   a collection tube connectable to said drain spout by said coupling means;
   an elbow tube connected to said collection tube;
   a transporting tube connected to said elbow tube opposite of said collection tube; and
   a T-member connected to said transporting tube opposite of said elbow tube and connected to said debris collecting means.

14. The self-filling birdbath system of claim 13, wherein said debris collecting means comprises:
   a length of collecting tube connected to said T-member opposite of said transporting tube; and
   a cap coupled to said collecting tube opposite of said T-member.

15. The self-filling birdbath system of claim 14, wherein said coupling means is a foam structure.

16. The self-filling birdbath system of claim 14, wherein said coupling means is silicone.

17. The self-filling birdbath system of claim 9, wherein said water filling means comprises:
   a female coupler connected to said pipe structure; and
   a garden hose coupled to said female coupler and to a water spout for selectively filling said pipe structure with water.

* * * * *